(12) United States Patent
Nagata et al.

(10) Patent No.: US 7,209,412 B2
(45) Date of Patent: Apr. 24, 2007

(54) OPTICAL HEAD AND OPTICAL DISK DRIVE UNIT THEREWITH

(75) Inventors: Takayuki Nagata, Hirakata (JP); Hironori Tomita, Ikoma (JP); Hideki Nakata, Seika-cho (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 540 days.

(21) Appl. No.: 10/853,181

(22) Filed: May 26, 2004

(65) Prior Publication Data

US 2004/0240334 A1    Dec. 2, 2004

(30) Foreign Application Priority Data

May 26, 2003  (JP) .............................. 2003-147242

(51) Int. Cl.
*G11B 7/00* (2006.01)

(52) U.S. Cl. ................ 369/44.14; 369/112.01

(58) Field of Classification Search ............ 369/44.14, 369/44.12, 44.15, 44.23, 44.24, 112.01, 112.1
See application file for complete search history.

(56) References Cited

U.S. PATENT DOCUMENTS 5,727,111 A    3/1998  Kume et al.

6,463,019 B2 * 10/2002  Kawano et al. .......... 369/44.14
2003/0048737 A1    3/2003  Nakamura et al.

FOREIGN PATENT DOCUMENTS

JP    10-143934    5/1998

\* cited by examiner

*Primary Examiner*—Nabil Hindi
(74) *Attorney, Agent, or Firm*—Wenderoth, Lind & Ponack, L.L.P.

(57) ABSTRACT

An optical head is provided which is capable of making an optical disk drive unit thinner. The optical head includes: a laser diode which emits light toward an optical disk; a photodiode which is disposed in the same housing as the laser diode; a light-turning mirror which reflects and deflects the light emitted from the laser diode; a light-raising mirror which reflects and deflects the light reflected by the light-turning mirror in the direction of the optical disk; an objective lens that converges the light reflected by the light-raising mirror onto the optical disk; and a hologram element which allows the light reflected by the optical disk to branch off and reach the photodiode, in which at least a part of the light-turning mirror is disposed inside of the window portion of a cartridge which houses the optical disk.

11 Claims, 8 Drawing Sheets

OPTICAL HEAD AND OPTICAL DISK DRIVE UNIT THEREWITH

BACKGROUND OF THE INVENTION

1. Field of the Invention

The present invention relates to the art of making an optical head thin in an optical disk drive unit which drives an optical disk used as an information recording medium such as an MD (or mini-disc).

2. Description of the Related Art

With respect to an optical head used for an optical disk drive unit which drives a CD (or compact disc) or the like, conventionally, such a devise has been made smaller and its costs lowered. This has been done by uniting light receiving and emitting elements so that optical parts can be integrated. This art is also applied to an optical head for optical magnetic recording, such as an MD, as disclosed, for example, in Japanese Patent Laid-Open No. 10-143934 specification.

Figure 11A:
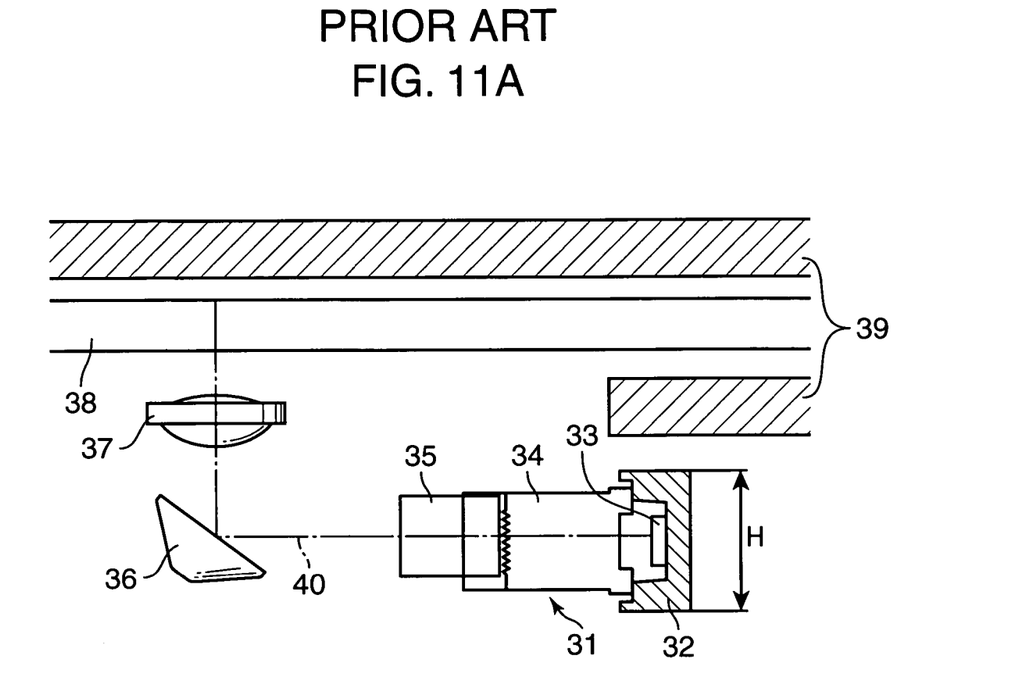
FIG. 11A is a side sectional view of the configuration of a conventional optical head.
Figure 11B:
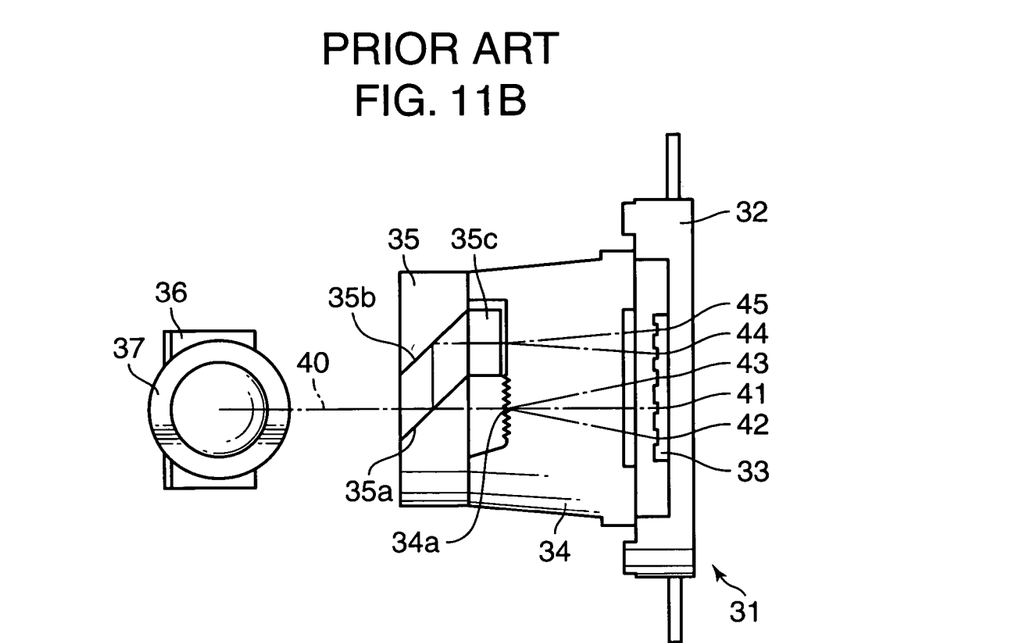
FIG. 11B is a top view of the configuration of the optical head.

FIG. 11A is a side view of an optical configuration of a conventional optical head in which such light receiving and emitting systems are integrated. FIG. 11B is a top view of the configuration shown in FIG. 11A. In FIG. 11A and FIG. 11B, components have the same reference numerals if they are identical. Hereinafter, the configuration shown in these figures will be described with reference to the figures.

In FIG. 11A, reference numeral 31 denotes an integrated unit, and 32 designates a package used as a case body. Inside of them, a silicon substrate 33 is disposed in which a light emitting element and light receiving elements are mounted or formed. The silicon substrate 33 is sealed in by the package 32 and a hologram element 34. A composite prism 35 is held to the hologram element 34. Reference numeral 36 denotes a light-raising mirror; 37, an objective lens; 38, an optical disk in which an optical magnetic signal is recorded; 39, a cartridge which houses the optical disk 38; and 40, an optical path which leads to the optical disk 38 from a light emitting element on the silicon substrate 33.

In FIG. 11B, reference numeral 41 designates a laser diode as a light emitting element disposed on the silicon substrate 33, and 42, 43, 44 and 45 denote photodiodes as light receiving elements.

Reference numeral and character 34a designates a diffraction grating which is formed in a plane of the hologram element 34. They are disposed in the region which the light emitted from the laser diode 41 passes through.

Reference numerals and characters 35a and 35b denote optical surfaces inside of the composite prism 35. The optical surface 35a, for example, transmits approximately 80 percent of a P-polarized light component, and reflects about 20 percent thereof. However, it reflects nearly 100 percent of an S-polarized light component. In short, its transmission and reflection depend upon polarization. On the other hand, the optical surface 35b reflects almost 100 percent of both a P-polarized light component and an S-polarized light component. Reference numeral and character 35c designates a Wollaston prism which is made of, for example, a birefringence material such as lithium niobate.

In the conventional optical head which has the above described configuration, the hologram element 34 and the composite prism 35 transmit the light emitted from the laser diode 41. Then, the light-raising mirror 36 shifts the direction of the optical path at an angle of approximately 90 degrees. Sequentially, the objective lens 37 converges the light onto the optical disk 38. In the optical disk 38, its polarization is slightly rotated by the Kerr effect. Then, the light is reflected, and again, passes through the objective lens 37. Next, it is incident on the composite prism 35 via the light-raising mirror 36. The optical surface 35a transmits approximately 80 percent of its P-polarization component. About 20 percent of the P-polarization component and almost 100 percent of the S-polarization component generated by the Kerr rotation are reflected.

At the diffraction grating 34a, for example, 10 percent of ± primary diffracted light of the light transmitted by the optical surface 35a is diffracted, respectively. Then, it is received by the photodiodes 42, 43. Although description is omitted of the detailed principle of such a detection, these light reception signals are calculated to obtain a focus error signal and a tracking error signal.

On the other hand, the light reflected by the optical surface 35a is reflected by the reflection surface 35b. Thereafter, it is separated into polarized light components by the Wollaston prism 35c. These components cross at a right angle and are received by the photodiodes 44, 45, respectively. Based on the differential between these light reception signals, an optical magnetic signal is detected.

The conventional optical head which has the above described configuration can be made smaller than the one in which the laser diode 41 is configured as a separate body from the photo diodes 42, 43, 44, 45. In addition, each component can be relatively positioned more precisely, thereby making the device more reliable. Besides, the number-of component parts can be reduced, thus lowering its costs.

Demand for thinner optical disk drive units has been rising in the marketplace. However, the above described conventional configuration shown in FIG. 11A has a disadvantage in that the thickness of the optical head in the thickness direction of the optical disk 38 cannot be made less than a width H of the package 32. This makes it difficult to thin an optical disk drive unit further.

Especially, in the case of a lead frame-type package, the number and pitch of lead wires determine the minimum value of the width H. For example, assuming that the number of lead wires is 14 and the pitch of lead wires is 0.5 mm, the limit of the width H is approximately 3.5 mm. If you take into account the clearance between the optical head and the cartridge, then the thickness of the optical head, or the distance from the lower surface of the cartridge to the lower surface of the optical head, about 4 mm at the minimum.

If you consider only the configuration, then the optical head can be made thin by shortening the distance between the integrated unit 31 and the light-raising mirror 36 and disposing the integrated unit 31 inside of the window of the cartridge 39. However, if the distance between the integrated unit 31 and the light-raising mirror 36 is shortened as described above, the optical-path length between them becomes short. This will raise problems, such as increasing an off-axis aberration when the objective lens 37 is shifted in a tracking operation.

BRIEF SUMMARY OF THE INVENTION

An optical head according to an aspect of the present invention, comprising: a light source which emits light to an optical disk; a housing to which the light source is attached; a light receiving element which is attached to the housing; a first reflecting member which reflects and deflects the light emitted from the light source; a second reflecting member which reflects and deflects the light reflected by the first reflecting member in the direction of the optical disk; an objective lens that converges the light reflected by the second reflecting member onto the optical disk; and a light-branching element which allows the light reflected by the optical disk to branch off and reach the light receiving element, wherein at least a part of the first reflecting member is disposed inside of a window portion of a cartridge which houses the optical disk.

According to this optical head, at least a part of the first reflecting member is disposed inside of the window portion of the cartridge which houses the optical disk. This makes it possible to reduce the thickness of the optical head.

If the first reflecting member is fixed to at least either of the housing and the light-branching element, each component can be relatively positioned more precisely, thereby making the optical head more reliable. In addition, the number of component parts such as cover glass can be reduced, thus lowering its costs.

The light source and the light receiving element may also be sealed in by the housing, the light-branching element and the first reflecting member. This prevents the optical surfaces of the first reflecting member and the light-branching element from getting fogged. Therefore, its performance becomes stable in every environment, there by making the optical head more reliable.

If one of an absorption region which keeps light from reflecting and a transmit region which transmits most of light is formed outside of the region in which the first reflecting member reflects an effective luminous flux, that prevents the light except an effective luminous flux from being reflected by the first reflecting member or the like and returning to the light receiving element. This reduces an offset or a noise in a light reception signal.

Furthermore, in a plane near the light source of a pair of opposite planes of the light-branching element in the optical-axis direction, a diffraction grating is formed, and in a region where the effective luminous flux does not pass in a plane apart from the light source thereof, a plane which has an inclined plane or a diffraction grating that guides a luminous flux except an effective luminous flux to the outside of the region is formed. According this configuration, the light except an effective luminous flux can be prevented from returning to the light receiving element via the objective lens, the optical disk and the like. This reduces an offset or a noise in a light reception signal. In addition, as described above, the unnecessary light can be kept from being reflected by the optical disk or the like and then returning. Therefore, in the case where a composite prism is used, this composite prism can be made thin to the minimum width at which an effective luminous flux passes, thereby reducing the optical head's costs.

Moreover, if the first reflecting member is united to the light-branching element, that reduces the number of component parts, thus lowering its costs.

In addition, the first reflecting member is configured by an optical surface of the light-branching element, which is formed to meet a total internal reflection condition. According this configuration, its costs can be reduced further.

Furthermore, the first reflecting member converts the diffusion angle of the light emitted from the light source. According this configuration, the apparent optical-path length between the light source and the light-branching element can be made more than the real optical-path length between them. Therefore, even if the optical head is made smaller, the apparent optical-path length between the light source and the light-branching element will not shorten. This keeps an off-axis aberration from increasing when the objective lens is shifted.

Moreover, the first reflecting member is disposed between the light-branching element and the light receiving element. According this configuration, even if the optical head is made thinner, the optical-path length between the light-branching element and the light receiving element can be kept from becoming shorter. This relaxes limitations on the width of the optical head when it is made thinner.

Furthermore, the present invention can also be an optical disk drive unit which comprises: the optical head; a focus controlling means which calculates a focus error signal based on a light reception signal from the light receiving element, and controls the position of the objective lens based on this focus error signal so that alight-convergent spot follows on the optical disk; and a tracking controlling means which calculates a tracking error signal based on the light reception signal from the light receiving element, and controls the position of the objective lens based on this tracking error signal so that the light-convergent spot follows a predetermined information track on the optical disk.

Furthermore, an optical head according to another aspect of the present invention, comprising: a light source which emits light toward an optical disk; a housing to which the light source is attached; a light receiving element which is attached to the housing; a first reflecting member which is disposed between the optical disk and the light source, and reflects and deflects the light emitted from the light source so that the incident light makes an acute angle with the reflected light; a second reflecting member which reflects and deflects the light reflected by the first reflecting member in the direction of the optical disk, so that the incident light makes an acute angle with the reflected light; an objective lens that converges the light reflected by the second reflecting member onto the optical disk; and a light-branching element which allows the light reflected by the optical disk to branch of f and reach the light receiving element.

According to this optical head, the first reflecting member and the second reflecting member each reflect the light, so that the incident light makes an acute angle with the reflected light. According this configuration, the thickness of the optical head can be reduced.

These and other objects, features and advantages of the present invention will become more apparent upon reading of the following detailed description along with the accompanied drawings.

BRIEF DESCRIPTION OF THE DRAWINGS

FIG. 2 is a schematic illustration, showing the main part of an optical disk drive unit which the optical head is applied to.

DETAILED DESCRIPTION OF THE INVENTION

Hereinafter, embodiments of the present invention will be described in detail with reference to the drawings. Herein, the present invention is not limited to the under-mentioned embodiments.

(First Embodiment)

Figure 1A:
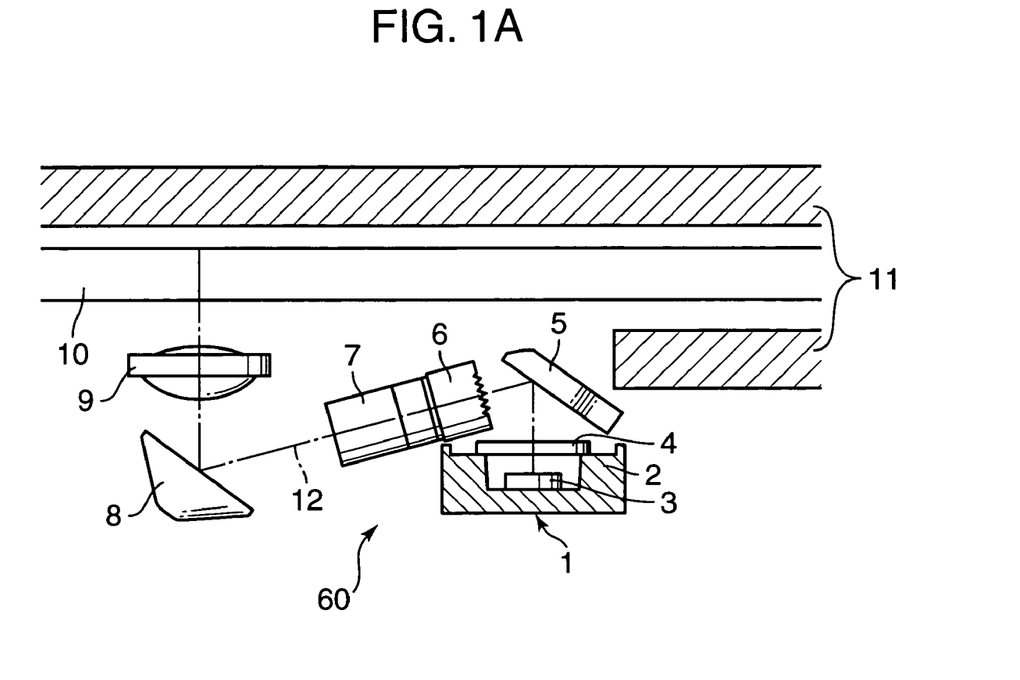
FIG. 1A is a side sectional view of the configuration of an optical head according to a first embodiment of the present invention.

FIG. 1A is a side sectional view of the configuration of an optical head 60 according to a first embodiment of the present invention. In the figure, reference numeral 1 denotes a light receiving-and-emitting unit, and 2 designates a package as a housing. The light receiving-and-emitting unit 1 is made up of: the package 2; a silicon substrate 3 which is disposed inside of this package 2; and cover glass 4 which covers the package 2. In the silicon substrate 3, a laser diode 13 which is a light emitting element and is used as a light source, and photodiodes 14, 15, 16, 17 which are light receiving elements, are mounted or formed (see FIG. 1B). The cover glass 4 is used to prevent particles such as dust from going into the package 2. The light receiving-and-emitting unit 1 is positioned so that the laser diode 13 emits light in a substantially perpendicular direction to an optical disk 10.

Reference numeral 5 denotes a light-turning mirror as an example of a first reflecting member; 6, a hologram element as an example of a light-branching element; 7, a composite prism; 8, a light-raising mirror as an example of a second reflecting member; 9, an objective lens; 10, an optical disk; 11, a cartridge; and 12, an optical path which leads to the optical disk 10 from a light emitting element on the silicon substrate 2. The optical disk 10 is configured, for example, as an MD (or mini-disc).

In general, the cartridge 11 includes a window portion through which the light emitted from the optical head 60 is led inside when recording or regeneration is conducted. Herein, the window portion can be opened and closed. The optical disk 10 attached to this cartridge 11 is inserted into an optical disk drive unit (not shown). Before it moves to the position where recording or regeneration can be conducted, the window portion of the cartridge 11 is opened. The optical head 60 is configured so that the light-turning mirror 5 is located inside of the window portion of the cartridge 11.

The light-turning mirror 5 is located between the light receiving-and-emitting unit 1 and the optical disk 10. The light-turning mirror 5 is also located, on the optical path 12, between the light receiving-and-emitting unit 1 and the hologram element 6. The light-turning mirror 5 is used to reflect light, and is placed in a direction where the angle formed by the track of light before and after the light-turning mirror 5 reflects it becomes acute.

The light-raising mirror 8 is located, on the optical path 12, between the composite prism 7 and the objective lens 9. This light-raising mirror 8 is also used to reflect light, and is placed in a direction where the angle formed by the track of light before and after the light-raising mirror 8 reflects it becomes acute. The optical path 12 is reflected and deflected by the light-turning mirror 5 and the light-raising mirror 8. As shown in FIG. 1A, therefore, it has a turned-over N shape if seen in the direction parallel to the optical disk 10.

Figure 1B:
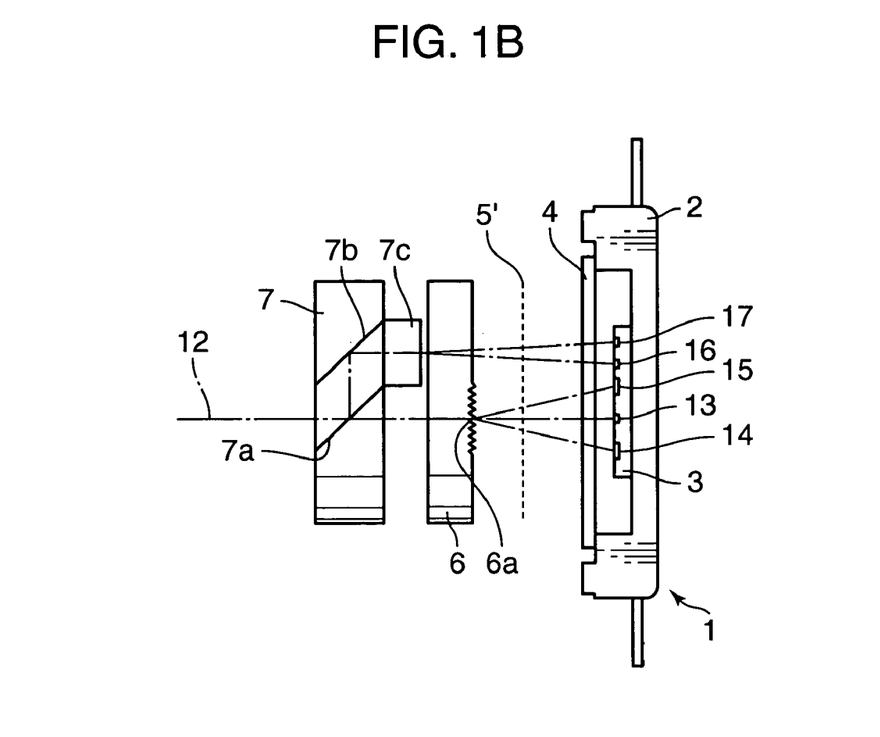
FIG. 1B is a top view of a light receiving-and-emitting unit, a hologram element and a composite prism in the optical head, showing them along an optical path.

FIG. 1B is a top view of the light receiving-and-emitting unit 1, the hologram element 6 and the composite prism 7, showing them along the optical path 12. In this figure, the components which are identical to those in FIG. 1A have the same reference numerals. A broken line 5' shows the position in which the optical path 12 is turned by the light-turning mirror 5.

Reference numeral and character 6a denotes a diffraction grating which is formed in a plane of the hologram element 6. This diffraction grating 6a is provided in the region where the light emitted from the laser diode 13 passes through. The diffraction grating 6a is located at the plane of the hologram element 6 on the side of the light receiving-and-emitting unit 1.

Reference numerals and characters 7a and 7b denote optical surfaces inside of the composite prism 7. This optical surface 7a, for example, transmits approximately 80 percent of the P-polarization component of light, and reflects about 20 percent thereof. However, it reflects nearly 100 percent of its S-polarization component. In short, its transmission and reflection depend upon polarization. On the other hand, the optical surface 7b reflects almost 100 percent of both the P-polarization component and the S-polarization component.

Reference numeral and character 7c designates a Wollaston prism which is made of, for example, a birefringence material such as lithium niobate.

In the optical head 60 according to the present invention which has the above described configuration, the cover glass 4 transmits the light emitted from the laser diode 13. Then, the light-turning mirror 5 turns the optical path at an acute angle. Sequentially, the hologram element 6 and the composite prism 7 transmits the light. Next, the light-raising mirror 8 shifts the direction of the optical path again at an acute angle in the direction of the optical disk 10. Then, the objective lens 9 converges the light onto the optical disk 10. This light is reflected by the optical disk 10. At this time, the light is reflected so that its polarization is slightly rotated by the Kerr effect. Then, this light again passes through the objective lens 9. Next, it is incident on the composite prism 7 via the light-raising mirror 8. The optical surface 7a transmits approximately 80 percent of the P-polarization component of the light. About 20 percent of the P-polarization component and almost 100 percent of the S-polarization component generated by the Kerr rotation are reflected.

The light transmitted by the optical surface 7a is incident on the hologram element 6. At the diffraction grating 6a, for example, 10 percent of the light's ±primary diffracted light is diffracted, respectively. Then, it passes through the cover glass 4 via the light-turning mirror 5, and is received by the photodiodes 14, 15. Although description is omitted of the detailed principle of such a detection, these light reception signals are calculated to obtain a focus error signal and a tracking error signal.

On the other hand, the light reflected by the optical surface 7a of the composite prism 7 is reflected by the reflection surface 7b. Thereafter, it is separated into polarized light components by the Wollaston prism 7c. These components cross at a right angle. Then, via the hologram element 6, the light-turning mirror 5 and the cover glass 4, they are received by the photodiodes 16, 17, respectively. Based on the differential between these light reception signals, an optical magnetic signal is detected.

In the optical head 60 according to the present invention which has the above described configuration, the light receiving-and-emitting unit 1 is horizontally positioned, and the light-turning mirror 5 is located so as to go into the window portion of the cartridge 11. Therefore, at least one part of the optical head 60 can be disposed inside of the window portion of the cartridge 11. This allows the optical head 60 to become thinner.

Furthermore, according to the first embodiment, as shown in FIG. 1A, both the light-turning mirror 5 and the light-raising mirror 8 turn light at an acute angle. Therefore, the light-turning mirror 5 is located closer to the optical disk 10 than the light-raising mirror 8 is. This helps the light receiving-and-emitting unit 1 come closer to the optical disk 10. As a result, the optical head 60 can be made thinner with the optical-path length maintained. In other words, the optical head 60 is configured so that the light-turning mirror 5 is located between the optical disk 10 and the light receiving-and-emitting unit 1. Besides, the light-turning mirror 5 and the light-raising mirror 8 are each arranged in such directions that the optical path has a turned-over N shape. Therefore, the light-turning mirror 5 can be configured so as to go into the window portion of the cartridge 11.

Moreover, according to the first embodiment, the light-turning mirror 5 is located, in the optical-axis direction, between the hologram element 6 and the photodiodes 14, 15, 16, 17. Therefore, even though the optical head 60 is made thinner, the optical-path length between the hologram element 6 and the photodiodes can be kept from becoming shorter. This is advantageous when you take into account the fact that the optical-path length between the hologram element 6 and the photodiodes cannot be made shorter than a predetermined distance. Accordingly, if the light-turning mirror 5 is disposed between these hologram element 6 and photodiodes, the space inside of the optical head 60 can be effectively used. This relaxes limitations on the width of the optical head 60 when it is made thinner.

Herein, according to the configuration of the present invention, if the light-turning mirror 5 is fixed at a predetermined position and angle with respect to a predetermined reference plane of the light receiving-and-emitting unit 1, the hologram element 6, or the optical head 60, then there is no need to adjust the position and angle of the light-turning mirror 5 even though the relative position of the light receiving-and-emitting unit 1, the hologram element 6, or the objective lens 9 is adjusted afterward.

This is because according to this configuration, the relative position of the light receiving-and-emitting unit 1, the hologram element 6, or the objective lens 9 may be adjusted along the optical axis of the light emitted from the light receiving-and-emitting unit 1. Even though the position or inclination of the light-turning mirror 5 is slightly shifted, their relative positions can be adjusted according to the shifted optical axis. For example, if a positioning member or the attachment surface of an optical base is precisely produced, then the positional precision of the light-turning mirror 5 would be approximately ±30 μm and the angular precision thereof would be about ±0.2 degrees, even though the light-turning mirror 5 is not adjusted.

Therefore, even if the light is turned like this configuration, no complicated adjustment process needs to be added. In addition, the optical-path length from the light receiving-and-emitting unit 1 to the objective lens 9 can be sufficiently secured. This prevents an off-axis aberration from increasing when the objective lens 9 is shifted.

Figure 2:
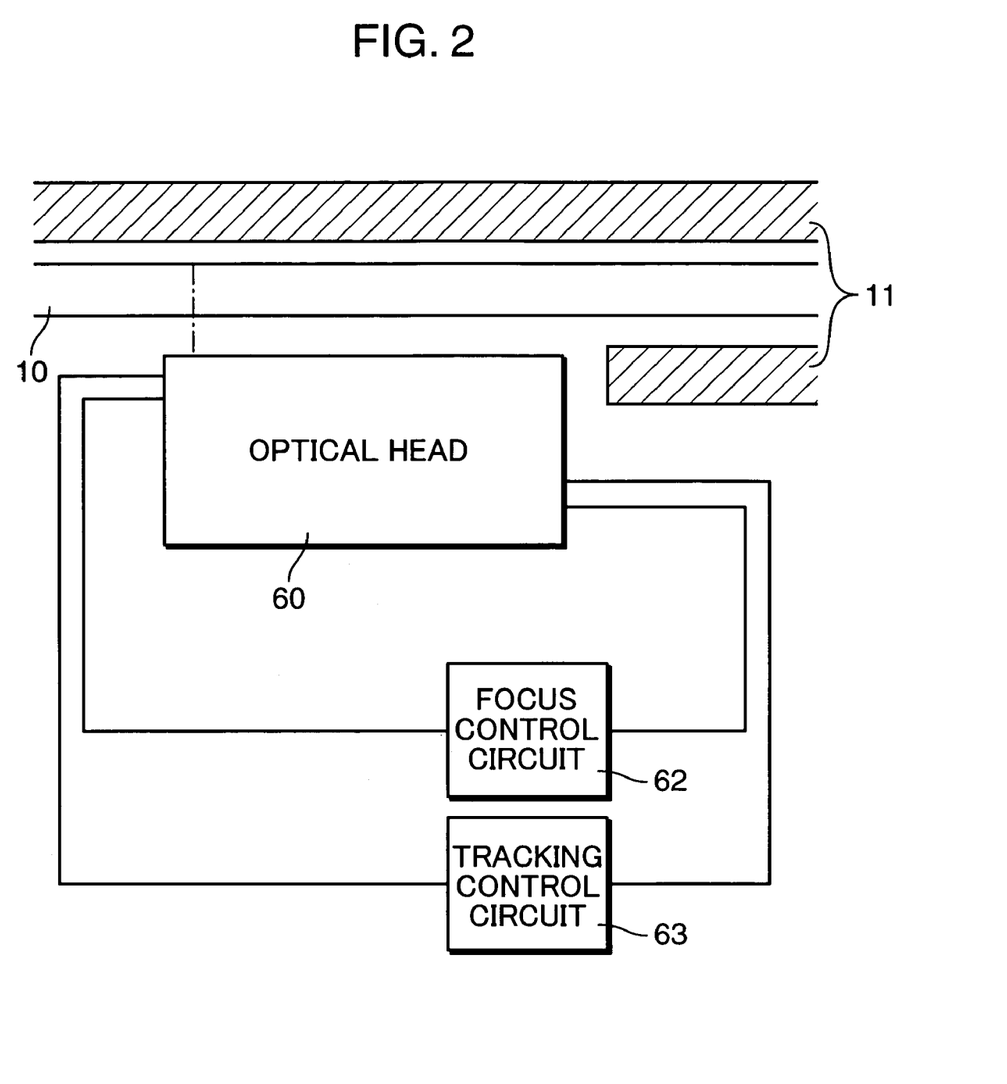

Hereinafter, an optical disk drive unit in which the optical head 60 is used will be described with reference to FIG. 2. This optical disk drive unit includes the optical head 60, a focus control circuit 62, and a tracking control circuit 63. The focus control circuit 62 calculates a focus error signal based on light reception signals from the photodiodes 14, 15. Then, based on this focus error signal, it controls the position of the objective lens 9. The tracking control circuit 63 calculates a tracking error signal based on light reception signals from the photodiodes 14, 15. Then, based on this tracking error signal, it controls the position of the objective lens 9. The objective lens 9 is driven in the direction perpendicular to the optical disk 10 and in the radius direction of the optical disk 10, so that the light-convergent spot can follow a predetermined information track on the optical disk 10.

(Second Embodiment)

Figure 3A:
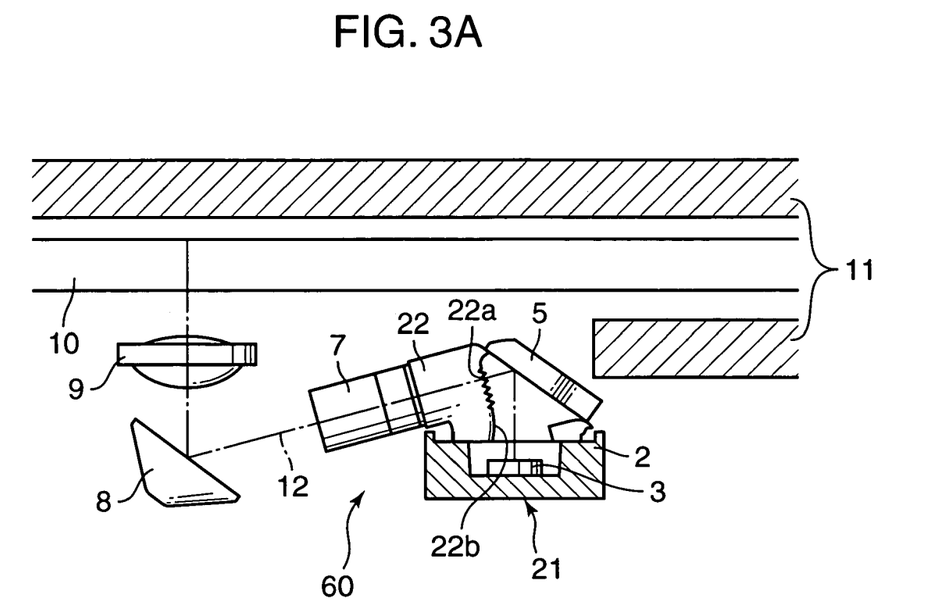
FIG. 3A is a side sectional view of the configuration of an optical head according to a second embodiment of the present invention.

FIG. 3A is a side sectional view of the configuration of an optical head 60 according to a second embodiment of the present invention. According to the second embodiment, only a light turning-type integrated unit 21 and a hologram element 22 which is a component thereof are different from the components according to the first embodiment. The other components are the same as those according to the first embodiment and have the same reference numerals, and thus, their description is omitted.

Figure 3B:
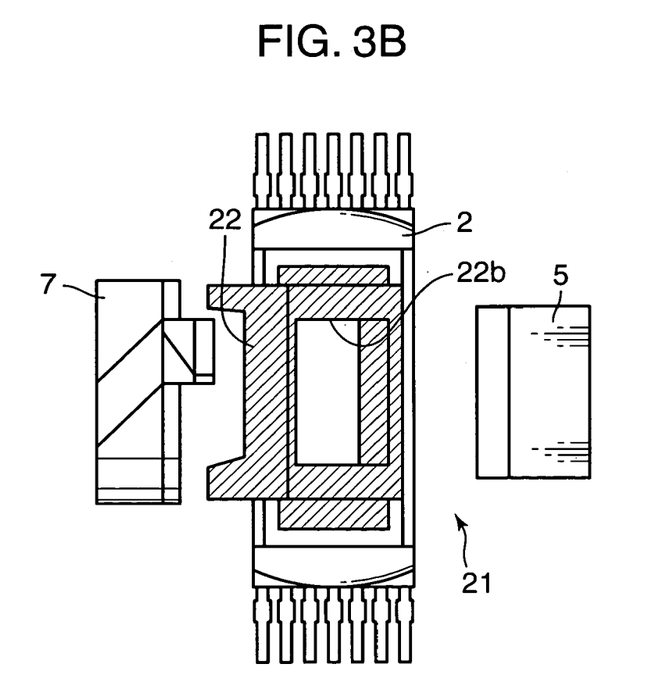
FIG. 3B is a top view of components of a light turning-type integrated unit in the optical head.

In FIG. 3A, the hologram element 22 is shown as its longitudinal section at the optical path 12. Reference numeral 22a denotes a diffraction grating which is formed in a plane of the hologram element 22. FIG. 3B is a top view of components of the light turning-type integrated unit 21. In this figure, for convenience of explanation, oblique lines are given to the hologram element 22. Besides, the light-turning mirror 5 and the composite prism 7 are shown somewhat apart from the hologram element 22.

The hologram element 22 according to the second embodiment shown in FIG. 3A and FIG. 3B is configured, for example, by molding a resin such as polycarbonate. In this hologram element 22, a through hole 22b penetrates up and down. The hologram element 22 is closely attached to the upper surface of the package 2, and the through hole 22b is covered with the light-turning mirror 5.

The hologram element 22 has the diffraction grating 22a, and thus, it functions as a light-branching element. In addition, the light-turning mirror 5 and the composite prism 7 are fixed to this hologram element 22, and thus, this hologram element 22 holds the light-turning mirror 5 and the composite prism 7. This gives it the function of positioning them with respect to the package 2.

According to this configuration, in addition to the advantages obtained according to the first embodiment, each component can be relatively positioned more precisely, thereby making the optical head 60 more reliable. In addition, the number of component parts such as the cover glass can be reduced, thus lowering its costs.

(Third Embodiment)

According to a third embodiment of the present invention, a hologram element 22 is the same as that according the second embodiment shown in FIG. 3A. However, it is different in respect of the fact that its connection surface is glued. Herein, description is omitted of the same configurations as those according the second embodiment.

Figure 4:
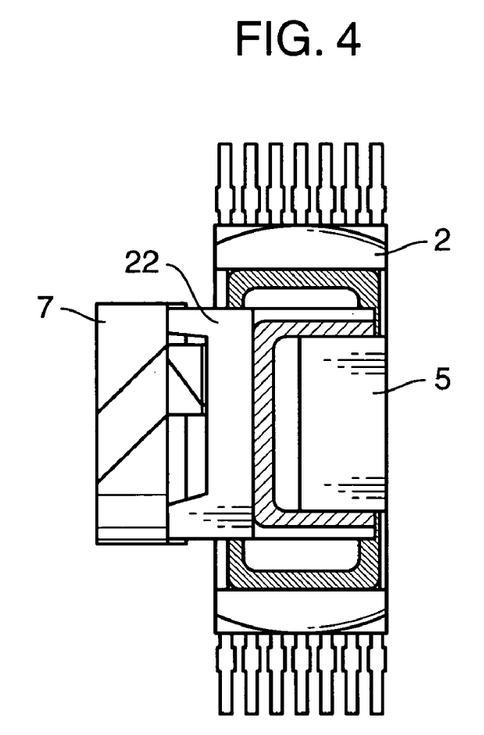
FIG. 4 is a top view of a light turning-type integrated unit according to a third embodiment of the present invention.

According to the third embodiment, as shown in FIG. 4, the connection surfaces of the package 2 and the hologram element 22 are glued together, and the connection surfaces of the hologram element 22 and the light-turning mirror 5 are glued together. Thereby, the silicon substrate 3 is completely sealed in. FIG. 4 is a top view of a light turning-type integrated unit according to the third embodiment. The oblique-line parts in the figure show glues which are applied outside of the connection surface.

According to this configuration, in addition to the advantages obtained according to the second embodiment, dew can be prevented from condensing on the silicon substrate 3 and rusting it. In addition, the optical surfaces of the light-turning mirror 5 and the hologram element 22 can be prevented from getting fogged. Therefore, the optical head 60's performance becomes stable in every environment, thereby making it more reliable.

(Fourth Embodiment)

Figure 5A:
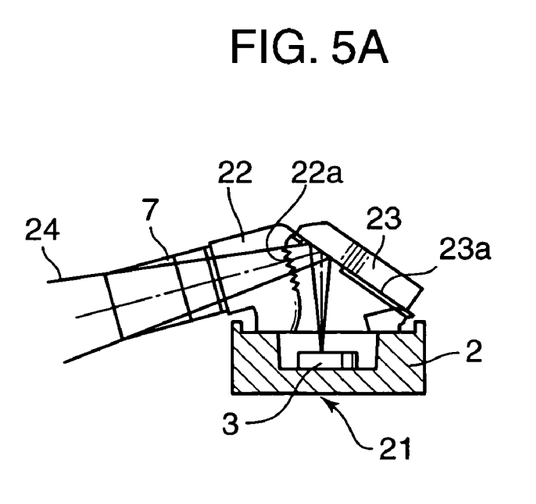
FIG. 5A is a side sectional view of a light turning-type integrated unit according to a fourth embodiment of the present invention.
Figure 5B:
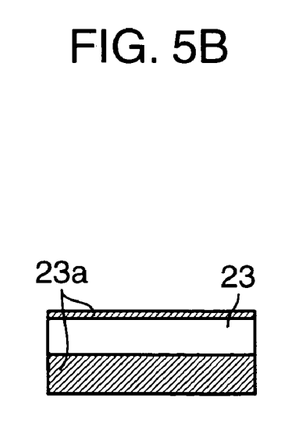
FIG. 5B is a front view of a light-turning mirror of the light turning-type integrated unit.

According to a fourth embodiment of the present invention, as shown in FIG. 5A and FIG. 5B, only a light-turning mirror 23 is different from the components according to the second and third embodiments. The other components are the same as those according to the second and third embodiments and have the same reference numerals and characters, and thus, their description is omitted.

FIG. 5A is a side sectional view of a light turning-type integrated unit 21 according to the fourth embodiment. FIG. 5B is a front view of the light-turning mirror 23, seen in the direction perpendicular to FIG. 5A.

In FIG. 5A and FIG. 5B, reference numeral 24 denotes a luminous flux which is emitted from the laser diode 13 on the silicon substrate 3. In a predetermined region of the reflection surface of the light-turning mirror 23, an absorption film 23a is disposed which absorbs light. This predetermined region is a region except the region where an effective luminous flux of the luminous flux 24 from the laser diode 13 which passes through the objective lens 9 is reflected, and the region where the light returned from the optical disk 10 which is diffracted by the diffraction grating 22a is reflected.

According to this configuration, in addition to the advantages obtained according to the second and third embodiments, the light except an effective luminous flux can be prevented from being reflected by the light-turning mirror 23 or the like and returning to the photodiodes on the silicon substrate 3. This reduces an offset or a noise in a light reception signal.

Herein, instead of the absorption film 23a, a transmit region which transmits most of light may also be formed in the predetermined region.

(Fifth Embodiment)

Figure 6A:
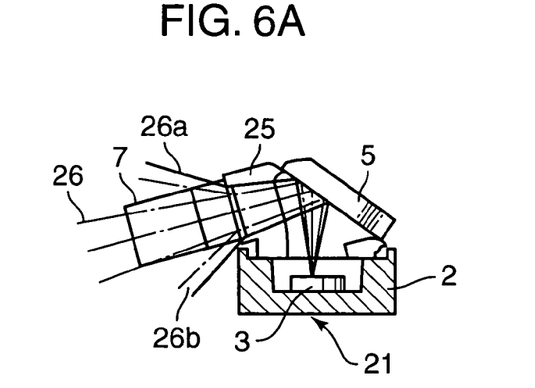
FIG. 6A is a side sectional view of a light turning-type integrated unit according to a fifth embodiment of the present invention.
Figure 6B:
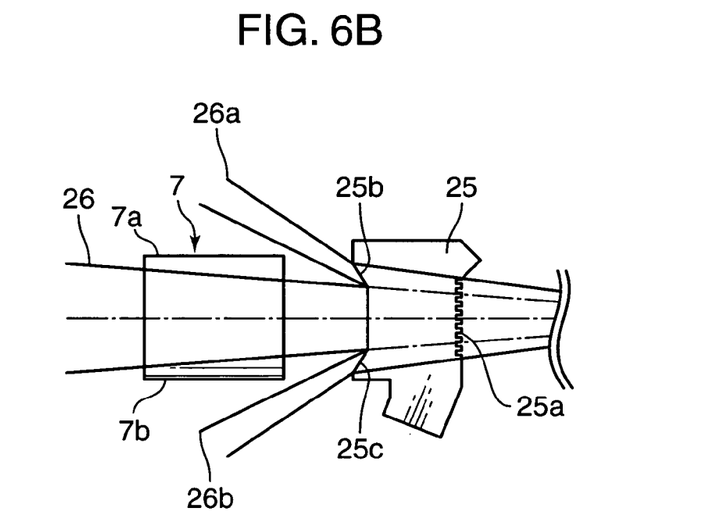
FIG. 6B is an enlarged view of a hologram element according to the fifth embodiment of the present invention.

According to a fifth embodiment of the present invention, as shown in FIG. 6A and FIG. 6B, only a hologram element 25 is different from the components according to the second embodiment. The other components are the same as those according to the second embodiment and have the same reference numerals, and thus, their description is omitted.

FIG. 6A is a side sectional view of a light turning-type integrated unit 21 according to the fifth embodiment of the present invention. FIG. 6B is an enlarged view mainly of the hologram element 25.

In FIG. 6A and FIG. 6B, reference numeral and character 25a denotes a diffraction grating, and 25b and 25c designate planes inclined with respect to the optical axis. These inclined planes 25b, 25c are formed in the region except the region where an effective luminous flux passes through in the plane on the side apart from the laser diode 13 in the hologram element 25. The inclined planes 25b, 25c have the function of refracting the light from the laser diode 13 in the swerving direction from the optical axis, in other words, in the direction apart from the optical axis. Reference numeral 26 designates an effective luminous flux which passes through the objective lens 9 of the light emitted from the laser diode 13 on the silicon substrate 3. 26a and 26b denote luminous fluxes which pass through the inclined planes 25b and 25c, respectively.

According to this configuration, in addition to the advantages obtained according to the second embodiment, the light reflected by sides surfaces 7a, 7b (i.e., upper and lower surfaces in the figure) of the composite prism 7 can be prevented from returning to the photodiodes on the silicon substrate 3 via the objective lens 9, the optical disk 10 and the like. This reduces an offset or a noise in a light reception signal. In addition, the unnecessary light reflected by the side surfaces 7a, 7a of the composite prism 7 can be kept from being generated. Therefore, the composite prism 7 can be made thin to the minimum width where an effective luminous flux passes, thereby reducing the optical head's costs.

Figure 6C:
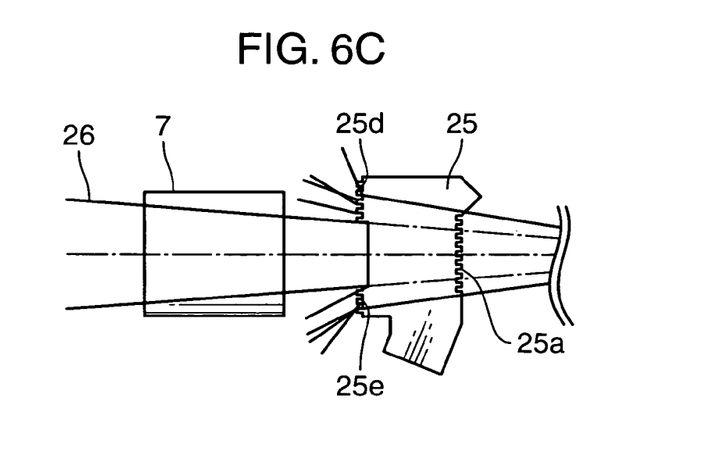
FIG. 6C is an enlarged view of another hologram element according to the fifth embodiment of the present invention.

Herein, as shown in FIG. 6C, instead of the configuration in which the inclined planes 25b, 25c are provided in a plane of the hologram element 25, uneven surfaces 25d, 25e may also be formed in a region except the region where an effective luminous flux passes through. Their unevenness can scatter the incident light, thereby presenting a similar advantage.

(Sixth Embodiment)

Figure 7A:
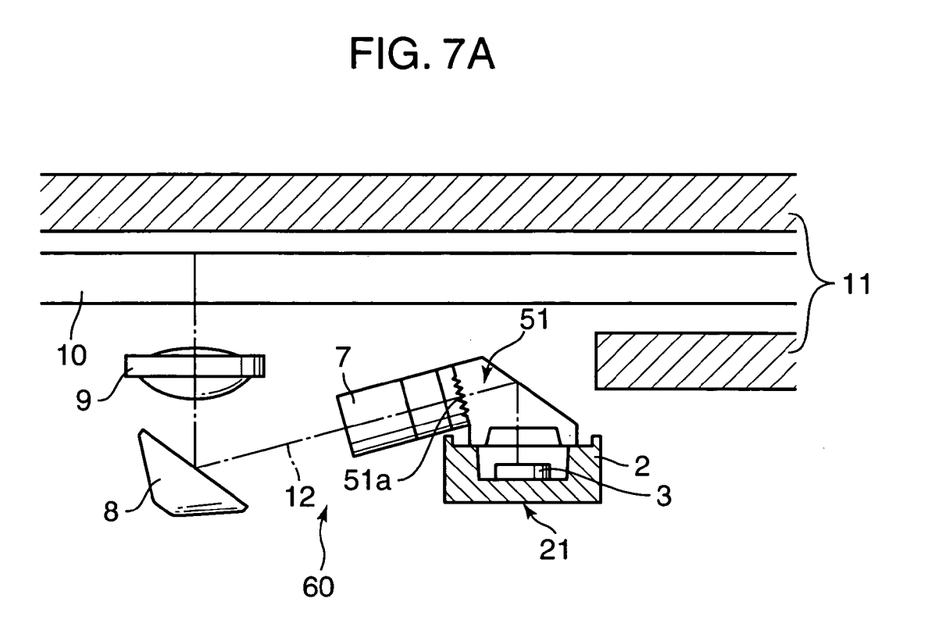
FIG. 7A is a side sectional view of the configuration of an optical head according to a sixth embodiment of the present invention.
Figure 7B:
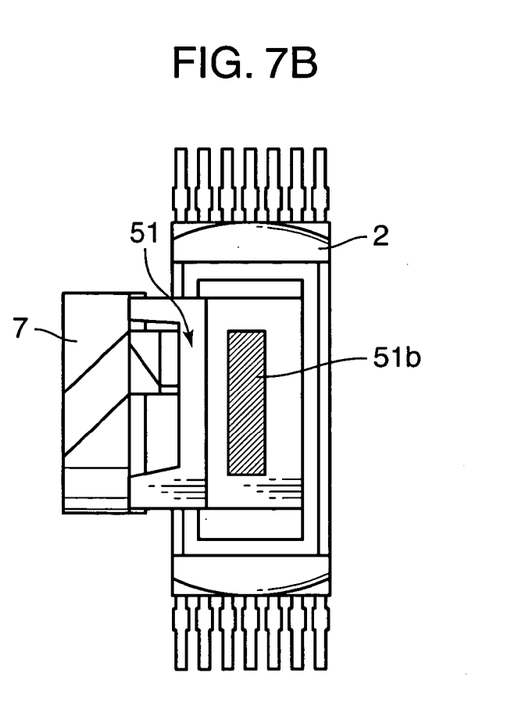
FIG. 7B is a top view of components of a light turning-type integrated unit according to the sixth embodiment of the present invention.

According to a sixth embodiment of the present invention, as shown in FIG. 7A and FIG. 7B, only a hologram element 51 is different from the components according to the second embodiment. The other components are the same as those according to the second embodiment and have the same reference numerals, and thus, their description is omitted.

FIG. 7A is a side sectional view of a light turning-type integrated unit 21 according to the sixth embodiment of the present invention. FIG. 7B is a top view of the light turning-type integrated unit 21.

In FIG. 7A and FIG. 7B, reference numeral 51 denotes a hologram element which is configured, for example, by molding a resin such as polycarbonate. Reference numeral and character 51a designates a diffraction grating which is formed in the hologram element 51, and 51b denotes a reflection film which is made of gold, a dielectric multilayer, or the like. This reflection film 51b corresponds to the first reflecting member according to the present invention, and is united with the hologram element 51. The plane of the hologram element 51 which is provided with the reflection film 51b is adjusted to the position and angle at which the light from the laser diode 13 is reflected toward the diffraction grating 51a.

According to this configuration, there is no need for a light-turning mirror which is a separate member from the hologram element 51. This reduces the number of component parts of the optical head, and also decreases the number of its assembly operations, thereby lowering its costs.

In addition, the attachment inclination of a light-turning mirror is not shifted at the time of the assemblage. This allows the optical head to be more precisely assembled.

(Seventh Embodiment)

Figure 8:
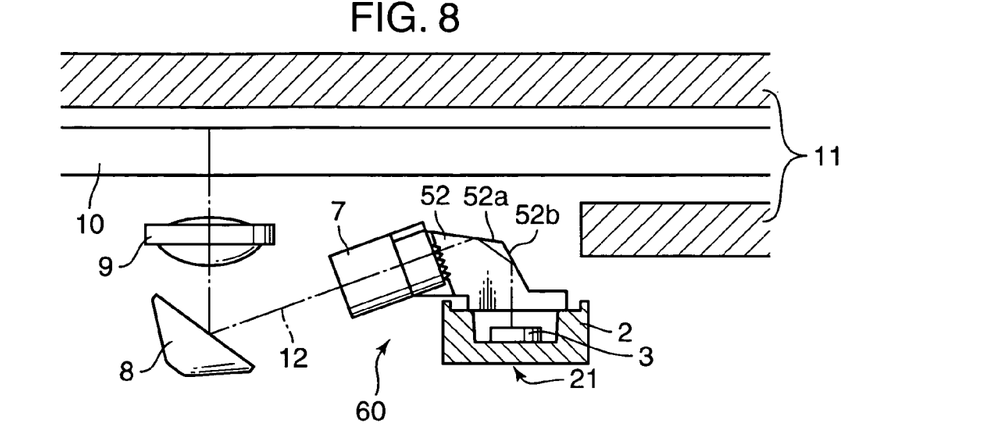
FIG. 8 is a side sectional view of the configuration of an optical head according to a seventh embodiment of the present invention.

FIG. 8 shows a hologram element 52 according to a seventh embodiment of the present invention. The components other than this hologram element 52 are the same as those according to the sixth embodiment, and thus, they have the same reference numerals.

According to the seventh embodiment, two reflection surfaces 52a, 52b are provided in the hologram element 52. These reflection surfaces 52a, 52b are configured so that the incident angle of a luminous flux meets a total internal reflection condition. According to this configuration, even though a reflection film is not provided in the reflection surfaces 52a, 52b, a high reflectance can be obtained, thus lowering the costs.

(Eighth Embodiment)

Figure 9:
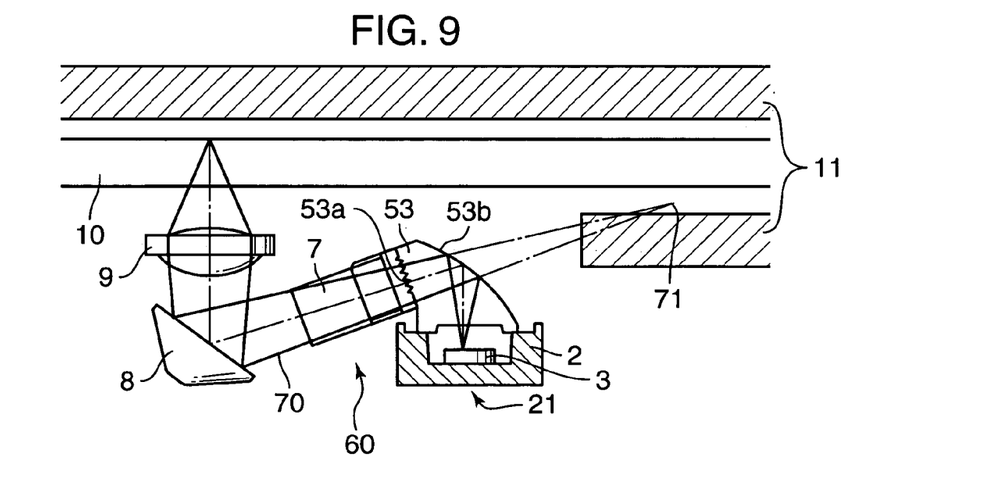
FIG. 9 is a side sectional view of the configuration of an optical head according to an eighth embodiment of the present invention.

FIG. 9 shows an optical head 60 according to an eighth embodiment of the present invention. According to the eighth embodiment, only a hologram element 53 is different from: the components according to the sixth embodiment. The other components are the same as those according to the sixth embodiment and have the same reference numerals, and thus, their description is omitted.

FIG. 9 is a side sectional view of a light turning-type integrated unit 21 according to the eighth embodiment. In this figure, reference numeral 53 denotes a hologram element; 53a, a diffraction grating of the hologram element 53; and 53b, a curved reflection surface which has a reflection film which is made of gold, a dielectric multi-layer, or the like. The reflection surface 53b is adjusted to the position and angle at which the light from the laser diode 13 is reflected toward the diffraction grating 53a. In addition, this reflection surface 53b is curved and concave on the side of the diffraction grating 53a. Thereby, it has the function of converting the diffusion angle of the light emitted from the laser diode 13 and then reflecting it. In other words, a luminous flux 70 from the laser diode 13 is reflected by the curved concave surface. Thereby, this luminous flux 70 is equivalent to the case where a light source is disposed at an apparent emission point 71 which is apart from the laser diode 13 in the optical-axis direction. This means that the optical path becomes longer than its real distance.

According to this configuration, even though the optical head 60 is made smaller, and thereby, the real distance between the laser diode 13 and the hologram element 53 shortens, the apparent optical-path length can be sufficiently secured. This keeps an off-axis aberration from increasing when the objective lens 9 is shifted. Herein, instead of forming the reflection surface which reflects the light from the laser diode 13 into a curved concave surface, this reflection surface may also have an NA conversion hologram.

(Ninth Embodiment)

Figure 10:
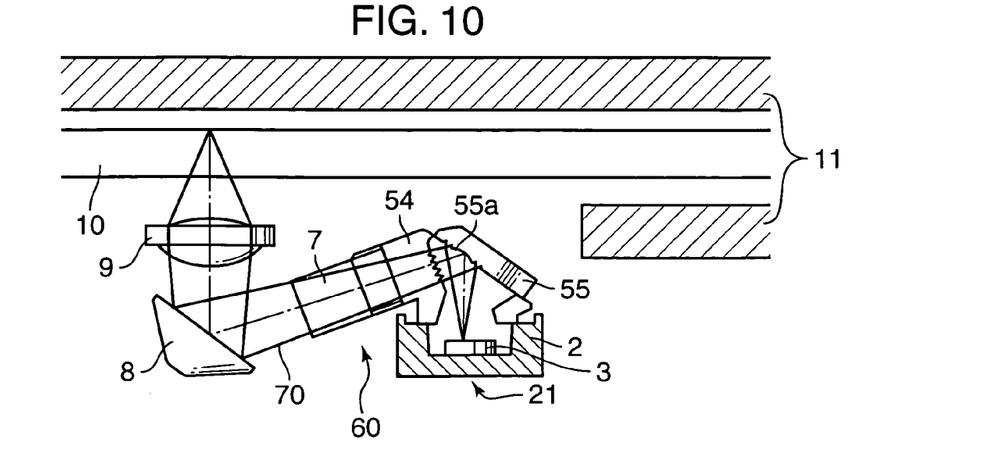
FIG. 10 is a side sectional view of the configuration of an optical head according to a ninth embodiment of the present invention.

FIG. 10 shows an optical head 60 according to a ninth embodiment of the present invention. According to the ninth embodiment, only a hologram element 54 and a light-turning mirror 55 are different from the components according to the second embodiment. The other components are the same as those according to the second embodiment and have the same reference numerals, and thus, their description is omitted.

The light-turning mirror 55 has an NA conversion hologram 55a on the reflection surface which reflects the light from the laser diode 13. The NA conversion hologram 55a converts the diffusion angle of the light and then reflects it. According to this configuration, in the same way as that according to the eighth embodiment, even though the optical head 60 is made smaller, the apparent optical-path length can be sufficiently secured. This keeps an off-axis aberration from increasing when the objective lens 9 is shifted. Herein, instead of the configuration in which the reflection surface has the NA conversion hologram 55a, this reflection surface may also be configured to be a curved concave surface. In that case, the same advantages can be obtained.

This application is based on Japanese patent application serial No. 2003-147242 filed in Japan Patent Office on May 26, 2003, and Japanese patent application serial No. 2004-115496 filed on Apr. 9, 2004, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical head, comprising:
   a light source which emits light to an optical disk;
   a housing to which said light source is attached;
   a light receiving element which is attached to said housing;
   a first reflecting member which reflects and deflects the light emitted from said light source;
   a second reflecting member which reflects and deflects the light reflected by said first reflecting member in the direction of the optical disk;
   an objective lens that converges the light reflected by said second reflecting member onto the optical disk; and
   a light-branching element which allows the light reflected by the optical disk to branch off and reach said light receiving element,
   wherein at least a part of said first reflecting member is disposed inside of a window portion of a cartridge which houses the optical disk.

2. The optical head according to claim 1, wherein said first reflecting member is fixed on at least either of said housing and said light-branching element.

3. The optical head according to claim 2, wherein said light source and said light receiving element are sealed in by said housing, said light-branching element and the first reflecting member.

4. The optical head according to claim 1, wherein one of an absorption region which keeps light from reflecting and a transmit region which transmits most of light is formed outside of a region in which said first reflecting member reflects an effective luminous flux.

5. The optical head according to claim 1, wherein in a plane near the light source of a pair of opposite planes of said light-branching element in the optical-axis direction, a diffraction grating is formed, and in a region where the effective luminous flux does not pass in a plane apart from the light source thereof, a plane which has one of an inclined plane and a diffraction grating that guides a luminous flux except an effective luminous flux to the outside of the region is formed.

6. The optical head according to claim 1, wherein said first reflecting member is united to said light-branching element.

7. The optical head according to claim 1, wherein said first reflecting member is configured by an optical surface of said light-branching element which is formed to meet a total internal reflection condition.

8. The optical head according to claim 1, wherein said first reflecting member converts the diffusion angle of the light emitted from said light source.

9. The optical head according to claim 1, wherein said first reflecting member is disposed between said light-branching element and said light receiving element.

10. An optical disk drive unit, comprising:
a light source which emits light toward an optical disk;
a housing to which said light source is attached;
a light receiving element which is attached to said housing;
a first reflecting member which reflects and deflects the light emitted from said light source;
a second reflecting member which reflects and deflects the light reflected by said first reflecting member in the direction of the optical disk;
an objective lens that converges the light reflected by said second reflecting member onto the optical disk;
a light-branching element which allows the light reflected by the optical disk to branch off and reach said light receiving element;
a focus controller which calculates a focus error signal based on a light reception signal from said light receiving element, and controls the position of said objective lens based on this focus error signal so that a light-convergent spot follows on the optical disk; and
a tracking controller which calculates a tracking error signal based on the light reception signal from said light receiving element, and controls the position of said objective lens based on this tracking error signal so that the light-convergent spot follows a predetermined information track on the optical disk,
wherein at least a part of said first reflecting member is disposed inside of a window portion of a cartridge which houses the optical disk.

11. An optical head, comprising:
a light source which emits light toward an optical disk;
a housing to which said light source is attached;
a light receiving element which is attached to said housing;
a first reflecting member which is disposed between the optical disk and said light source, and reflects and deflects the light emitted from said light source so that the incident light makes an acute angle with the reflected light;
a second reflecting member which reflects and deflects the light reflected by said first reflecting member in the direction of the optical disk, so that the incident light makes an acute angle with the reflected light;
an objective lens that converges the light reflected by said second reflecting member onto the optical disk; and
a light-branching element which allows the light reflected by the optical disk to branch off and reach said light receiving element.

* * * * *